(12) United States Patent
Huang (10) Patent No.: US 10,378,503 B2
(45) Date of Patent: Aug. 13, 2019

(54) FLUID TURBINE BLADE DEVICE

(71) Applicant: Kuo-Chang Huang, Tainan (TW)

(72) Inventor: Kuo-Chang Huang, Tainan (TW)

( * ) Notice: Subject to any disclaimer, the term of this patent is extended or adjusted under 35 U.S.C. 154(b) by 338 days.

(21) Appl. No.: 15/452,326

(22) Filed: Mar. 7, 2017

(65) Prior Publication Data

US 2017/0260960 A1    Sep. 14, 2017

(30) Foreign Application Priority Data

Mar. 8, 2016   (TW) .............................. 105107070 A (51) Int. Cl.
| | |
|---|---|
| *F03B 3/18* | (2006.01) |
| *F03B 3/04* | (2006.01) |
| *F03B 11/02* | (2006.01) |
| *F03B 17/06* | (2006.01) |

(52) U.S. Cl.
CPC ............... *F03B 3/186* (2013.01); *F03B 3/04* (2013.01); *F03B 11/02* (2013.01); *F03B 17/061* (2013.01); *F05B 2210/402* (2013.01); *F05B 2240/13* (2013.01); *F05B 2250/181* (2013.01); *F05B 2250/25* (2013.01); *Y02E 10/28* (2013.01); *Y02E 10/38* (2013.01)

(58) Field of Classification Search
CPC .. F03B 3/186; F03B 11/02; F03B 3/04; F03B 17/061; F03B 3/125; F03B 3/18; F03B 13/268; F05B 2210/402; F05B 2250/25; F05B 2240/13; Y02E 10/28; Y02E 10/38; Y02E 10/72; Y02E 10/22; F01D 5/043; F01D 5/045; F01D 5/048; F03D 1/04

USPC ......... 415/199.1, 2, 4, 6, 186, 206, 908, 72, 415/191; 290/42, 53; 405/75

See application file for complete search history.

(56) References Cited

U.S. PATENT DOCUMENTS

| | | | | |
|---|---|---|---|---|
| 1,433,995 | A * | 10/1922 | Fowle ................... | F03D 1/0608 415/1 |
| 4,159,191 | A * | 6/1979 | Graybill ................ | F03D 1/0608 415/4.3 |
| 7,942,071 | B2 * | 5/2011 | Claisse ..................... | G01F 1/10 415/191 |
| 2009/0015018 | A1 * | 1/2009 | Nail ......................... | F03B 3/125 290/55 |
| 2010/0316493 | A1 * | 12/2010 | Presz, Jr. .................. | F03D 1/04 415/191 |
| 2011/0097154 | A1 * | 4/2011 | Chu ........................ | F03B 13/00 405/75 |

(Continued)

*Primary Examiner* — Dwayne J White
*Assistant Examiner* — Wesley Le Fisher
(74) *Attorney, Agent, or Firm* — Muncy, Geissler, Olds & Lowe, P.C.

(57) ABSTRACT

A wind turbine blade device includes a rotating unit including a blade module concentrically connected to a rotating shaft thereof and having a plurality of radially curved channels each having inlet and outlet ends. The inlet and outlet ends of the radially curved channels are configured to respectively permit flow of the flow body into and out thereof. An outer tube includes a tube body surrounding the rotating unit, and a plurality of rib plates provided in the tube body. The outlet end of each radially curved channel corresponds to one of the rib plates, and each radially curved channel forms an included angle with a corresponding rib plate such that the flow body flowing out of the outlet end can impact upon the corresponding rib plate.

10 Claims, 6 Drawing Sheets

(56) References Cited

U.S. PATENT DOCUMENTS

| | | | |
|---|---|---|---|
| 2012/0100004 A1* | 4/2012 | McClellan | F03B 13/08 416/241 R |
| 2012/0328425 A1* | 12/2012 | Morales Franqui | F03D 1/025 415/187 |
| 2014/0044521 A1* | 2/2014 | Bae | F03B 17/063 415/7 |
| 2017/0145981 A1* | 5/2017 | Culpepper | F03B 3/126 |

\* cited by examiner

FLUID TURBINE BLADE DEVICE

CROSS-REFERENCE TO RELATED APPLICATION

This application claims priority of Taiwanese Patent Application No. 105107070, filed on Mar. 8, 2016.

FIELD

The disclosure relates to a blade device, more particularly to a fluid turbine blade device which uses water current to generate electricity.

BACKGROUND

In recent years, the development of low-cost pollution-free power generation system has been gradually receiving attention, such as wind power generation, solar power generation, water power generation, etc. Each of the aforesaid power generation methods uses natural resources to conduct power generation, when compared with the thermal power generation method which uses petroleum, coal, etc., is more environmentally friendly and has lower pollution.

SUMMARY

Therefore, an object of the present disclosure is to provide a fluid turbine blade device that uses flow body of a body of water, such as river or ocean, to generate electricity and that has a novel structure.

Accordingly, a fluid turbine blade device of this disclosure includes a rotating unit and an outer tube. The rotating unit includes a rotating shaft extending along an axis, and a first blade module concentrically connected to the rotating shaft. The first blade module is configured to be driven by a flow body to rotate the rotating shaft about the axis in a rotating direction. The first blade module has a plurality of angularly spaced-apart radially curved channels extending radially, outwardly and curvedly from a central portion of the first blade module in a direction opposite to the rotating direction. Each radially curved channel has a first inlet end proximate to the central portion of the first blade module, and a first outlet end distal from the central portion of the first blade module. The first inlet ends of the radially curved channels are configured to permit flow of the flow body into the radially curved channels. The first outlet ends of the radially curved channels are configured to permit flow of the flow body out of the radially curved channels.

The outer tube includes a tube body surrounding the rotating unit, and a plurality of angularly spaced-apart rib plates provided in the tube body. The first outlet end of each of the radially curved channels corresponds to one of the rib plates, and each of the radially curved channels forms an included angle with the corresponding one of the rib plates such that the flow body flowing out of the first outlet end of each of the radially curved channels can impact upon the corresponding one of the rib plates.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the present disclosure is described in greater detail, it should be noted herein that like elements are denoted by the same reference numerals throughout the disclosure.

Referring to FIGS. 1 to 4, a fluid turbine blade device 100 according to the first embodiment of this disclosure is configured to use the flow body of a body of water, such as a river, an ocean, or the like, to generate electricity. The blade device 100 comprises an outer tube 1 and a rotating unit 2.

Figure 1:
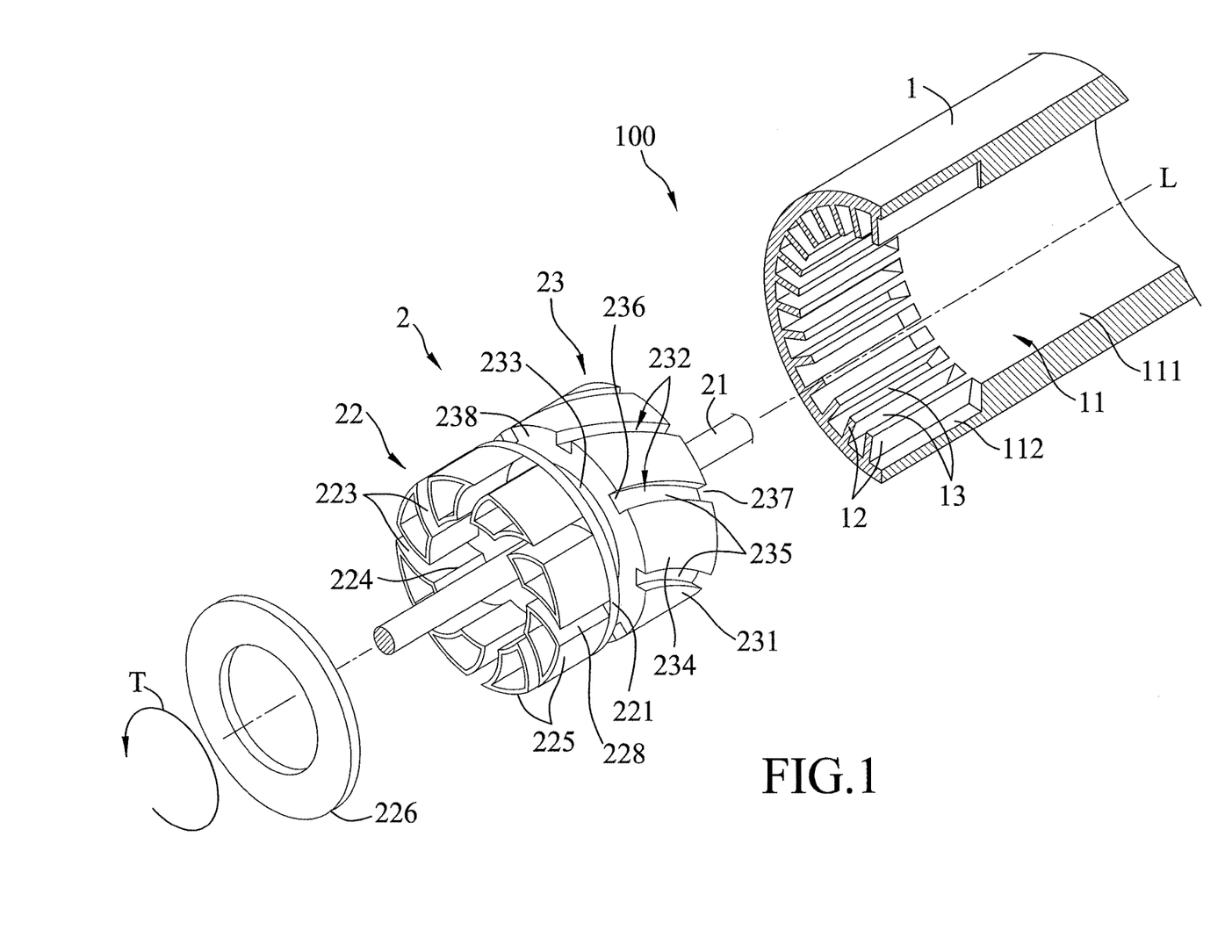
FIG. 1 is a fragmentary partly sectional view of a fluid turbine blade device according to the first embodiment of this disclosure.
Figure 2:
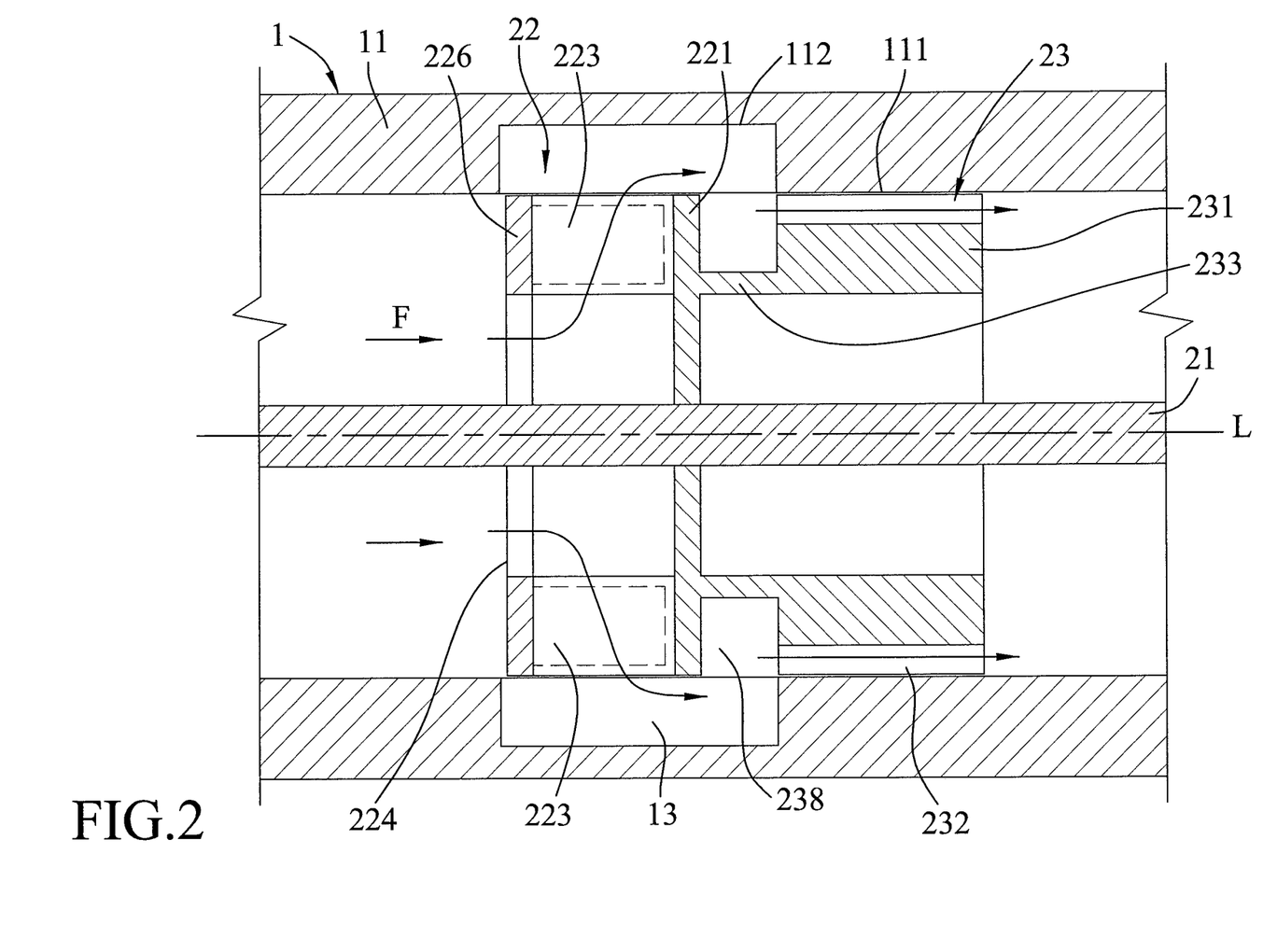
FIG. 2 is a fragmentary enlarged sectional view of the first embodiment in an assembled state.

The outer tube 1 includes a tube body 11 extending in a front-rear direction along an axis (L), and a plurality of rib plates 12 provided in the tube body 11. The tube body 11 is configured to permit the flow body to flow from a front side to a rear side thereof, and has a tube inner surface 111 surrounding the axis (L), and an inner annular groove 112 extending inwardly from the tube inner surface 111. The rib plates 12 project radially from a groove surface of the inner annular groove 112 toward the axis (L), and are angularly spaced apart from each other. Each two adjacent ones of the rib plates 12 cooperatively define a connecting channel 13 extending along the front-rear direction.

The rotating unit 2 is disposed in the tube body 11, and includes a rotating shaft 21 extending along the axis (L) and having two opposite ends mounted respectively and rotatably on two frame bodies (not shown), a first blade module 22 coaxially connected to the rotating shaft 21, and a second blade module 23 connected to a rear side of the first blade module 22.

Figure 3:
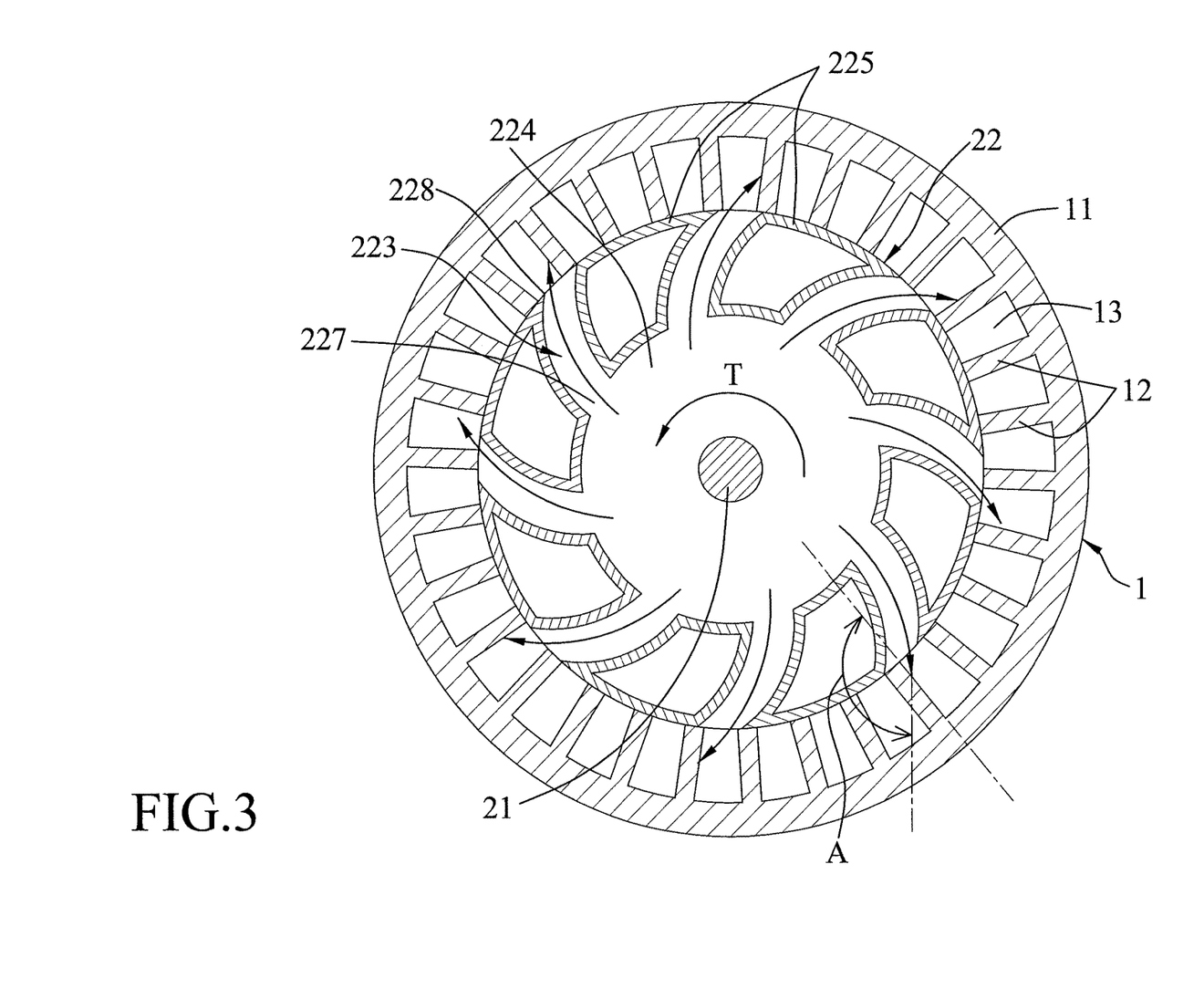
FIG. 3 is a sectional front view, illustrating how a flow body flows through a first blade module of the first embodiment.

The first blade module 22 is configured to be driven by the flow body to rotate the rotating shaft 21 about the axis (L) in a rotating direction (T). The first blade module 22 includes an annular base wall 221 sleeved fixedly on the rotating shaft 21 and having an outer periphery immediately adjacent to the rib plates 12, a plurality of angularly spaced-apart blade blocks 225 disposed on a front surface of the base wall 221 and surrounding the axis (L), a plurality of radially curved channels 223 each of which is defined by two adjacent ones of the blade blocks 225, and a cover plate 226 covering front sides of the blade blocks 225. Each blade block 225 is hollow to reduce the overall weight of the first blade module 22. The base wall 221 and the blade blocks 225 cooperatively define an entry hole 224 located at a central portion of the first blade module 22.

Each radially curved channel 223 is curved in a direction opposite to the rotating direction (T), and has a first inlet end 227 proximate to the central portion of the first blade module 22 and communicating with the entry hole 224, and a first outlet end 228 distal from the central portion of the first blade module 22 and corresponding to one of the rib plates 12. The first inlet ends 227 of the radially curved channels 223 are configured to permit flow of the flow body into the radially curved channels 223. The first outlet ends 228 of the radially curved channels 223 are configured to permit flow of the flow body out of the radially curved channels 223.

The cover plate 226 has a ring shape that defines an opening communicating with the entry hole 224.

Figure 4:
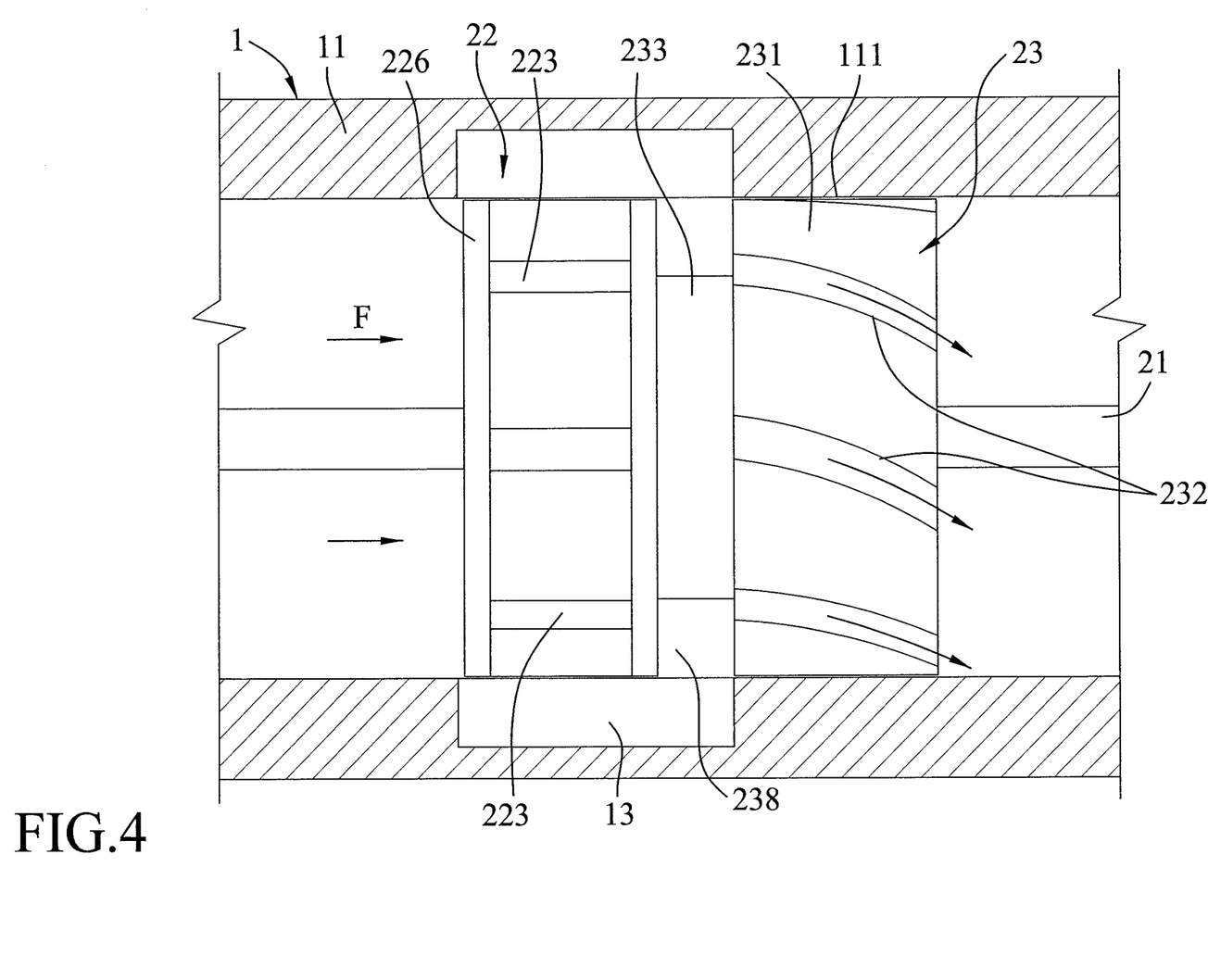
FIG. 4 is a fragmentary enlarged partly sectional view, illustrating how the flow body flows through a second blade module of the first embodiment.

The second blade module 23 includes a blade wall 231 surrounding the axis (L) and spaced rearwardly from the base wall 221, and a ring-shaped connecting wall 233 connected between the base wall 221 and the blade wall 231. The blade wall 231 has a hollow tubular shape, and has an outer peripheral surface 234 proximate to the tube inner surface 111, and a plurality of angularly spaced-apart channel surfaces 235 extending inwardly from the outer peripheral surface 234. Each channel surface 235 defines an axially curved channel 232. Each axially curved channel 232 extends in the front-rear direction, is curved in a direction opposite to the rotating direction (T), and has a second inlet end 236 proximate to the first blade module 22, and a second outlet end 237 distal from the first blade module 22. The second inlet ends 236 of the axially curved channels 232 are configured to permit flow of the flow body into the axially curved channels 232. The second outlet ends 237 of the axially curved channels 232 are configured to permit flow of the flow body out of the axially curved channels 232.

The connecting channel 13 defined by each two adjacent ones of the rib plates 12 communicates with the first outlet end 228 of a corresponding one of the radially curved channels 223 and the second inlet end 236 of a corresponding one of the axially curved channels 232. The base wall 221, the blade wall 231 and the connecting wall 233 cooperatively define a communication space 238 which surrounds the connecting wall 233 and which communicates the connecting channels 13 and the axially curved channels 232. Through this, the flow body flowing out of the first outlet ends 228 of the radially curved channels 223 can flow through the corresponding connecting channels 13, through the communication space 238 and into the corresponding axially curved channels 232.

Referring again to FIGS. 2 to 4, to use the fluid turbine blade device 100 of this disclosure, the fluid turbine blade device 100 is placed in the body of water. Flow body in the body of water will flow into the outer tube 1 along a flow direction (F). When the flow body encounters the cover plate 226, it is guided by the cover plate 226 to flow into the entry hole 224 through the opening thereof, and is distributed into the radially curved channels 223 through the first inlet ends 227. As the flow body contacts wall surfaces of the blade blocks 225 that define the respective radially curved channels 223, it will impose a force upon the wall surfaces of the blade blocks 225 and generate a torque that will drive the first blade module 22 to rotate. When the flow body flows out of the first outlet ends 228 of the radially curved channels 223, because each of the radially curved channels 223 forms an included angle (A) with the corresponding one of the rib plates 12, the flow body will impact upon the corresponding rib plates 12 and generate a counterforce. The included angle (A) is larger than 90 degrees but smaller than 180 degrees. Since the flow body is continuously flowing, the counterforce is transmitted back to the wall surfaces of the blade blocks 225 so as to increase the torque applied to the first blade module 22.

After the flow body flowing out of the first outlet ends 228 flows into the connecting channels 13, it will converge at the communication space 238. Since the flow body is flowing continuously into the communication space 238, the flow body in the communication space 238 is squeezed rearward to flow and distribute into the axially curved channels 232. When the flow body is squeezed into each axially curved channel 232 and then flows rearwardly out of the same, because the cross section of each axially curved channel 232 is flat, it will impact upon the flow body at a rear side of the rotating unit 2 and generate a counterforce. Through the configuration of the axially curved channels 232, the counterforce has a direction similar to the rotating direction (T), and generates a torque that drives the second blade module 23 to rotate in the rotating direction (T). It should be noted herein that the first and second blade modules 22, 23 rotate at the same time in the rotating direction (T).

Through the torques applied to the first and second blade modules 22, 23, the rotating shaft 21 can be driven to rotate. In practice, a power generator (not shown) may be disposed on a rear or front end of the rotating shaft 21. The power generator can convert the kinetic energy of the rotating shaft 21 into electrical energy. Since there are many types of power generators that are well known in the art, and since the power generator is not an important aspect of this disclosure, a detailed description thereof is dispensed herewith for the sake of brevity.

It should be noted herein that when the fluid turbine blade device 100 of this disclosure is used in the river, since the water level of the upstream of the river is usually higher than that of the downstream, when a front side of this disclosure faces the upstream of the river and a rear side thereof faces the downstream of the river, the flow body at the rear side of the rotating unit 2 may only partially fill the tube body 11 or only reach the height of the rotating shaft 21. As such, when the flow body flows out of the axially curved channels 232 located above the axis (L), it will directly contact the air, so that the counterforce is very weak and is negligible. However, the flow body flowing out of the axially curved channels 232 located below the axis (L) can still be acted upon by the counterforce to apply a torque upon the second blade module 23.

It is worth to mention herein that the fluid turbine blade device 100 of this disclosure may be disposed upright on a body of water flow body that flows in a top-bottom direction. For example, when a water pressure pipe is used to guide water to flow from top to bottom, the axis (L) of the outer tube 1 extends in the top-bottom direction, and the front and rear ends of the fluid turbine blade device 100 respectively face upward and downward. Similarly, the flow body flowing downward can drive and rotate the blade device 100 of the disclosure. Hence, as long as the front end of the fluid turbine blade device 100 faces the flow direction (F) of the flow body, any position of this disclosure on a body of water is acceptable, and is not limited to the aforesaid disclosure.

From the aforesaid description, with the shape of the first blade module 22 matching that of the outer tube 1, when the flow body flows through the radially curved channels 223, a torque is generated to drive the first blade module 22 to rotate in the rotating direction (T). Further, through the configuration of the second blade module 23, when the flow body flows through the axially curved channels 232, a torque generated therefrom has the same direction as the rotating direction (T), so that the overall torque of the rotating unit 2 is increased, thereby enhancing the power generating efficiency of the power generator.

Figure 5:
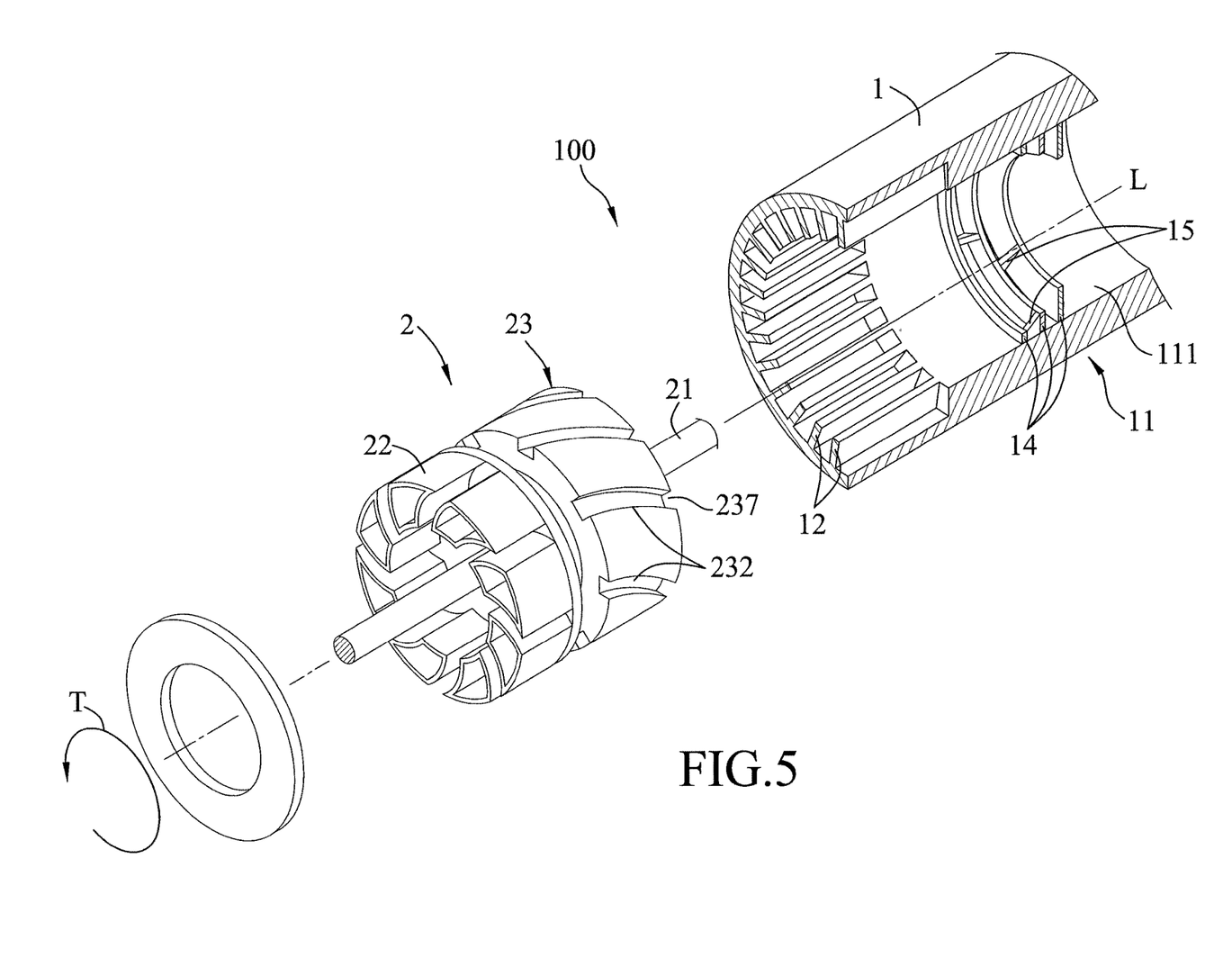
FIG. 5 is a fragmentary partly sectional view of a fluid turbine blade device according to the second embodiment of this disclosure.
Figure 6:
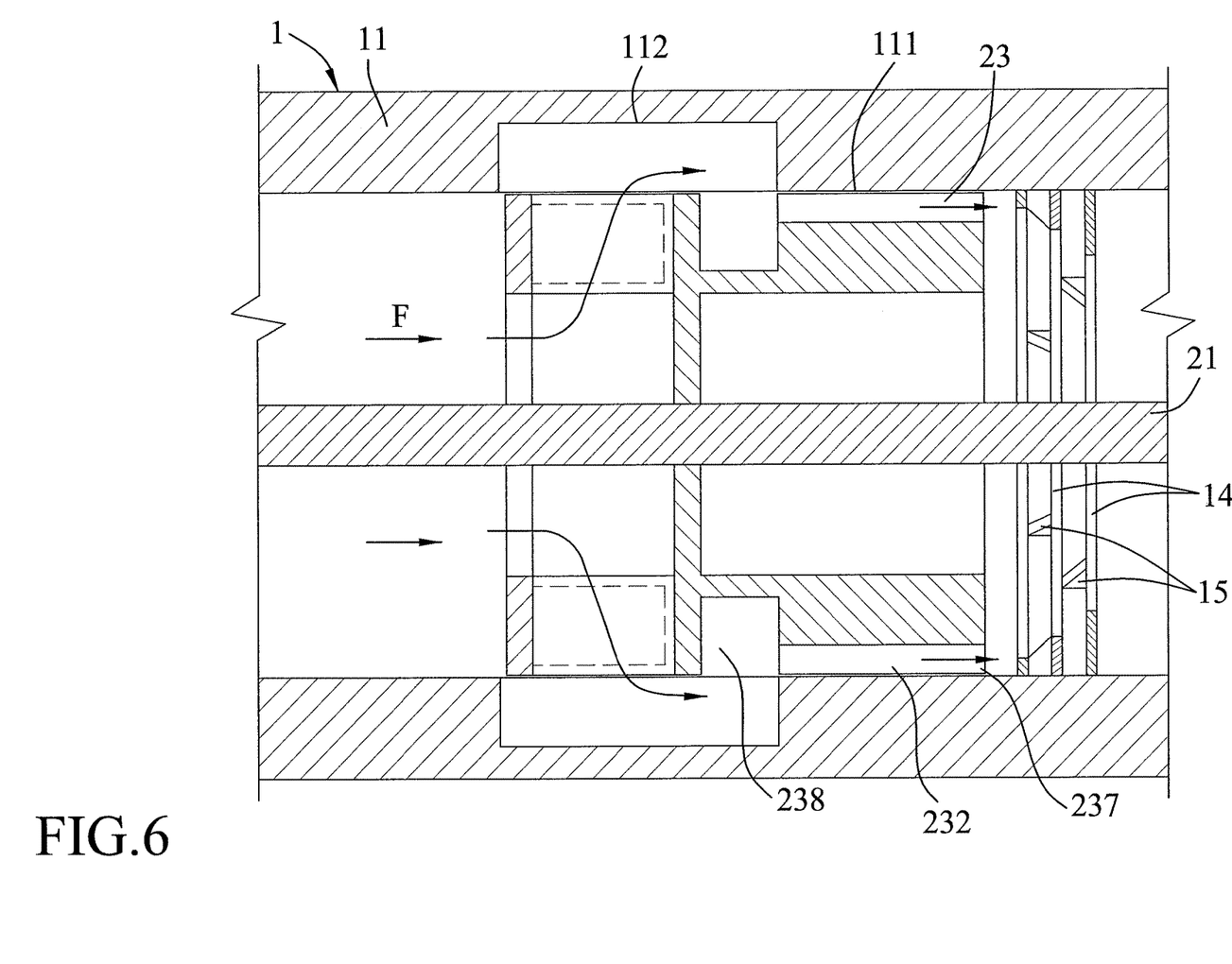
FIG. 6 is a fragmentary enlarged sectional view of the second embodiment in an assembled state.

Referring to FIGS. 5 and 6, the second embodiment of the fluid turbine blade device 100 of this disclosure is generally identical to the first embodiment, and only differs in that the outer tube 1 of the second embodiment further includes three ring plates 14 connected to the tube inner surface 111 and surrounding the axis (L), and a plurality of angularly spaced-apart blocking plates 15 connected to the tube inner surface 111 and surrounding the axis (L). The ring plates 14 are located rearwardly of the second outlet ends 237 of the axially curved channels 232, and are spaced apart from each other along the axis (L). Each ring plate 14 has a radial length measured from the tube inner surface 111 toward the axis (L). The radial lengths of the ring plates 14 are arranged in an increasing manner. The ring plate 14 having the shortest radial length is proximate to the second outlet ends 237 of the axially curved channels 232. The blocking plates 15 are provided between each two adjacent ring plates 14. Specifically, each blocking plate 15 is connected to the tube inner surface 111 and the corresponding two adjacent ring plates 14. In practice, each blocking plate 15 may only be connected to the tube inner surface 111 or one of the ring plates 14.

Use of the second embodiment only differs from that of the first embodiment in that when the flow body flows out of the axially curved channels 232, it will flow in a direction opposite to the rotating direction (T), and through the disposition of the ring plates 14 and the blocking plates 15, the flow body can move rearward and directly impact the ring plates 14 and the blocking plates 15 to generate a great counterforce so that the torque applied to the rotating unit 2 can be further enhanced.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A fluid turbine blade device comprising:
   a rotating unit including a rotating shaft extending along an axis, and a first blade module concentrically connected to said rotating shaft, said first blade module being configured to be driven by a flow body to rotate said rotating shaft about the axis in a rotating direction, said first blade module having a plurality of angularly spaced-apart radially curved channels extending radially, outwardly and curvedly from a central portion of said first blade module in a direction opposite to the rotating direction, each of said radially curved channels having a first inlet end proximate to the central portion of said first blade module, and a first outlet end distal from the central portion of said first blade module, said first inlet ends of said radially curved channels being configured to permit flow of the flow body into said radially curved channels, said first outlet ends of said radially curved channels being configured to permit flow of the flow body out of said radially curved channels; and
   an outer tube including a tube body surrounding said rotating unit, and a plurality of angularly spaced-apart rib plates provided in said tube body;
   wherein said first outlet end of each of said radially curved channels corresponds to one of said rib plates, and each of said radially curved channels forms an included angle with the corresponding one of said rib plates such that the flow body flowing out of said first outlet end of each of said radially curved channels can impact upon the corresponding one of said rib plates.

2. The fluid turbine blade device as claimed in claim 1, wherein said included angle is larger than 90 degrees but smaller than 180 degrees.

3. The fluid turbine blade device as claimed in claim 2, wherein said rotating unit further includes a second blade module connected to and disposed inwardly of said first blade module and configured to be driven by the flow body to rotate along with said first blade module in the rotating direction, said second blade module having a plurality of angularly spaced-apart axially curved channels surrounding the axis, each of said axially curved channels being curved in a direction opposite to the rotating direction, and having a second inlet end proximate to said first blade module, and a second outlet end distal from said first blade module, said second inlet ends of said axially curved channels being configured to permit flow of the flow body into said axially curved channels, said second outlet ends of said axially curved channels being configured to permit flow of the flow body out of said axially curved channels.

4. The fluid turbine blade device as claimed in claim 3, wherein each two adjacent ones of said rib plates cooperatively define a connecting channel communicating with said first outlet end of a corresponding one of said radially curved channels and said second inlet end of a corresponding one of said axially curved channels.

5. The fluid turbine blade device as claimed in claim 4, wherein said tube body has a tube inner surface, and an inner annular groove extending inwardly from said tube inner surface, and said rib plates project radially from a groove surface of said inner annular groove toward said rotating unit.

6. The fluid turbine blade device as claimed in claim 5, wherein said second blade module includes a blade wall surrounding the axis, said blade wall having an outer peripheral surface proximate to said tube inner surface, and a plurality of angularly spaced-apart channel surfaces extending inwardly from said outer peripheral surface and respectively defining said axially curved channels.

7. The fluid turbine blade device as claimed in claim 6, wherein said second blade module further includes a ring-shaped connecting wall connected between said first blade module and said blade wall, and wherein said first blade module, said blade wall and said connecting wall cooperatively define a communication space which surrounds said connecting wall and which communicates said connecting channels and said axially curved channels.

8. The fluid turbine blade device as claimed in claim 2, wherein said first blade module includes an annular base wall sleeved fixedly on said rotating shaft, and a plurality of angularly spaced-apart blade blocks disposed on a front surface of said base wall and surrounding the axis, each two adjacent ones of said blade blocks cooperatively defining a corresponding one of said radially curved channels, said base wall and said blade blocks cooperatively defining an entry hole located at the central portion of said first blade module, said first inlet ends of said radially curved channels communicating with said entry hole.

9. The fluid turbine blade device as claimed in claim 8, wherein said first blade module further includes a cover plate covering front sides of said blade blocks and having a ring shape that defines an opening communicating with said entry hole.

10. The fluid turbine blade device as claimed in claim 6, wherein said outer tube further includes at least one ring plate connected to said tube inner surface and surrounding the axis, and a plurality of angularly spaced-apart blocking plates connected to said tube inner surface and surrounding the axis, said at least one ring plate and said blocking plates being disposed proximate to said second outlet ends of said axially curved channels and being configured to permit the flow body flowing out of said axially curved channels to impact thereupon.

\* \* \* \* \*